US012227371B2

(12) United States Patent
Dietrick

(10) Patent No.: US 12,227,371 B2
(45) Date of Patent: Feb. 18, 2025

(54) ROLLER CONVEYOR GAP FILLER SYSTEM

(71) Applicant: Lewco, Inc., Sandusky, OH (US)

(72) Inventor: Chester Ellsworth Dietrick, Flat Rock, MI (US)

(73) Assignee: LEWCO, INC., Sandusky, OH (US)

( * ) Notice: Subject to any disclaimer, the term of this patent is extended or adjusted under 35 U.S.C. 154(b) by 91 days.

(21) Appl. No.: 18/316,421

(22) Filed: May 12, 2023

(65) Prior Publication Data

US 2023/0365346 A1    Nov. 16, 2023

Related U.S. Application Data

(60) Provisional application No. 63/341,707, filed on May 13, 2022.

(51) Int. Cl.
*B65G 47/66* (2006.01)
*B65G 13/11* (2006.01)
(Continued)

(52) U.S. Cl.
CPC .............. *B65G 47/66* (2013.01); *B65G 13/11* (2013.01); *B65G 13/12* (2013.01); *B65G 21/10* (2013.01);
(Continued)

(58) Field of Classification Search
CPC ........ B65G 47/66; B65G 47/52; B65G 39/12; B65G 39/10; B65G 21/10; B65G 13/11; B65G 13/12
(Continued)

(56) References Cited

U.S. PATENT DOCUMENTS 2,536,961 A * 1/1951 Smith .................... B65G 47/66
                                                    198/606
4,718,543 A * 1/1988 Leisner .................. B65G 17/24
                                                    198/779
(Continued)

FOREIGN PATENT DOCUMENTS

WO         2023220361 A1      11/2023

OTHER PUBLICATIONS

"International Search Report and Written Opinion for PCT Patent Application No. PCT/US23/22025", Mailed Date: Sep. 12, 2023, 12 pages.

Primary Examiner — James R Bidwell
(74) Attorney, Agent, or Firm — CALFEE, HALTER & GRISWOLD LLP

(57) ABSTRACT

A roller gap filler system for a conveyor having rollers. The system including a first mounting bracket, second mounting bracket, and first filler bar. The first mounting bracket is configured to mount adjacent a first end of the rollers, and the second mounting bracket is configured to mount adjacent a second end of the rollers, where the second end is opposite the first end. The first filler bar is configured to extend between the first mounting bracket and the second mounting bracket and be positioned between a first roller and a second roller of the plurality of rollers. A plunger is associated with the first filler bar, the plunger being moveable between a coupling position to couple the first filler bar to the second mounting bracket and a release position to uncouple the first filler bar from the second mounting bracket, where the plunger is biased to the coupling position.

20 Claims, 9 Drawing Sheets

(51) Int. Cl.
   *B65G 13/12* (2006.01)
   *B65G 21/10* (2006.01)
   *B65G 39/10* (2006.01)
   *B65G 39/12* (2006.01)
   *B65G 47/52* (2006.01)

(52) U.S. Cl.
   CPC .............. *B65G 39/12* (2013.01); *B65G 39/10* (2013.01); *B65G 47/52* (2013.01)

(58) Field of Classification Search
   USPC ........................................................ 193/35 R
   See application file for complete search history.

(56) References Cited

U.S. PATENT DOCUMENTS

| | | | | |
|---|---|---|---|---|
| 5,311,982 | A * | 5/1994 | Clopton | B65G 17/38 198/779 |
| 5,884,744 | A * | 3/1999 | Slodkowski | B65G 13/075 188/74 |
| 11,142,407 | B2 * | 10/2021 | Schroader | B65G 13/10 |
| 11,661,283 | B2 * | 5/2023 | Pettinga | B65G 39/12 193/35 R |
| 2007/0023257 | A1 | 2/2007 | Schiesser | |
| 2010/0230247 | A1 * | 9/2010 | Mckee | B65G 47/66 198/804 |
| 2017/0008705 | A1 * | 1/2017 | Sammauro | B65G 15/62 |
| 2017/0174444 | A1 | 6/2017 | Schroader et al. | |
| 2019/0002209 | A1 | 1/2019 | McKee | |
| 2019/0002210 | A1 | 1/2019 | Hekman et al. | |
| 2023/0278808 | A1 * | 9/2023 | Pettinga | B65G 13/07 198/600 |

\* cited by examiner

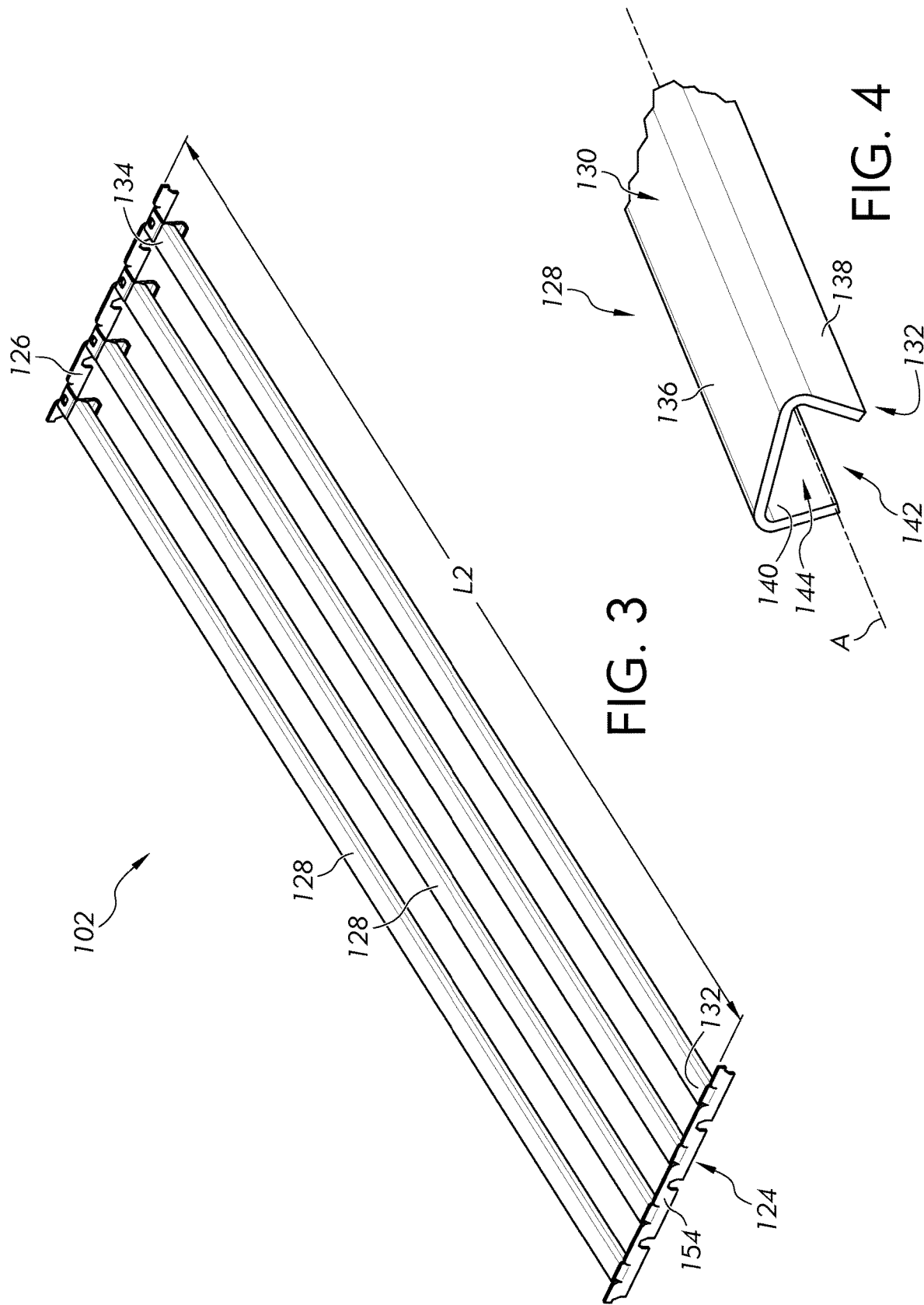

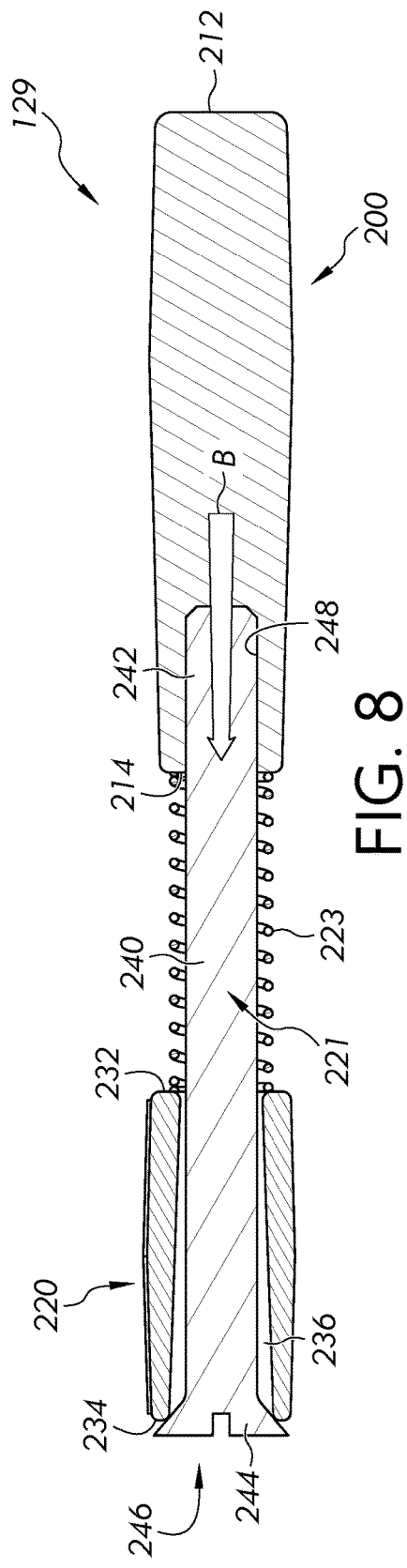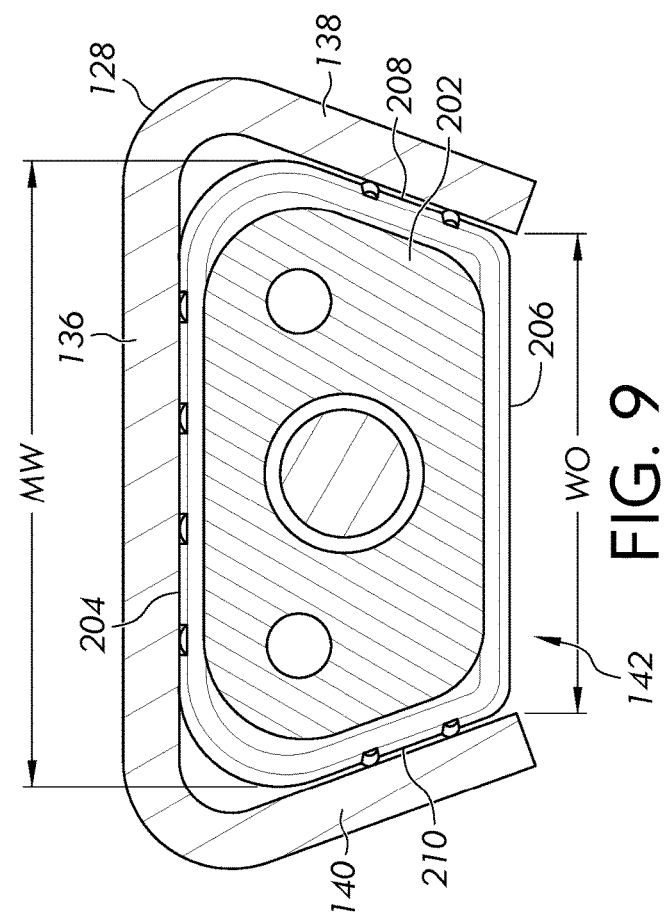

ROLLER CONVEYOR GAP FILLER SYSTEM

RELATED APPLICATIONS

The present application claims the benefit of U.S. Provisional Patent Application 63/341,707, filed May 13, 2022, titled Roller Conveyor Gap Filler System, which is incorporated herein by reference in its entirety.

BACKGROUND

Conveyor systems can be used in various commercial and manufacturing applications to transport objects between different locations. A roller conveyor system is a type of conveyor system that utilizes a plurality of rotatable rollers (i.e., evenly spaced apart rotating cylinders) to allow objects to move along the length of the conveyor system. The rollers may be free-rotating rollers, such as in a gravity roller conveyor, or may be driven, such as by a belt, chains, motors, or other drive mechanisms.

The size of the rollers and the spacing between the rollers are commonly selected based on the type and size of objects being conveyed. In some cases, however, the size of objects being conveyed may be so diverse or may have changed from what was initially planned for the conveyor system, that the spacing between rollers may be excessive for the objects being conveyed. As a result, some small objects may fall between the rollers and fail to be conveyed.

SUMMARY

The following is a brief summary of subject matter that is described in greater detail herein. This summary is not intended to be limiting as to the scope of the claims.

Various examples described herein provide for a roller gap filler system for a roller conveyor.

In an example, a roller gap filler system for a roller conveyor having a plurality of rollers includes a first mounting bracket, a second mounting bracket, and a first filler bar. The first mounting bracket is configured to mount adjacent a first end of the rollers, and the second mounting bracket is configured to mount adjacent a second end of the rollers, where the second end is opposite the first end. The first filler bar is configured to extend between the first mounting bracket and the second mounting bracket and be positioned between a first roller and a second roller of the plurality of rollers. Moreover, a plunger is associated with the first filler bar (e.g., the first filler bar can include the plunger, the plunger can be positioned within the first filler bar); the plunger is moveable between a coupling position to couple the first filler bar to the second mounting bracket and a release position to uncouple the first filler bar from the second mounting bracket, where the plunger is biased to the coupling position.

In another example, a method of filling a gap between rollers of a roller conveyor system having rollers rotatably mounted on axles includes supporting a first mounting bracket on the axles at a first end of the rollers and supporting a second mounting bracket on the axles at a second end of the rollers. The method further includes positioning a filler bar in the gap between the rollers, supporting a first end of the filler bar with the first mounting bracket and coupling a second end of the filler bar to the second mounting bracket with a latching mechanism, where the latching mechanism has a moveable member configured to move between a coupling position to couple the second end to the second mounting bracket, and a release position to uncouple the second end from the second mounting bracket. The method further includes biasing the moveable member to the coupling position.

This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is a perspective view of the exemplary roller gap filler system.

FIG. 4 is a partial perspective view of an exemplary filler bar of the roller gap filler system of FIG. 3.

FIG. 8 is a cross section view of the latching mechanism of FIG. 7.

FIG. 9 is a cross section view of the latching mechanism of FIG. 7 installed in the filler bar of the roller gap filler system.

DETAILED DESCRIPTION

Figure 1:
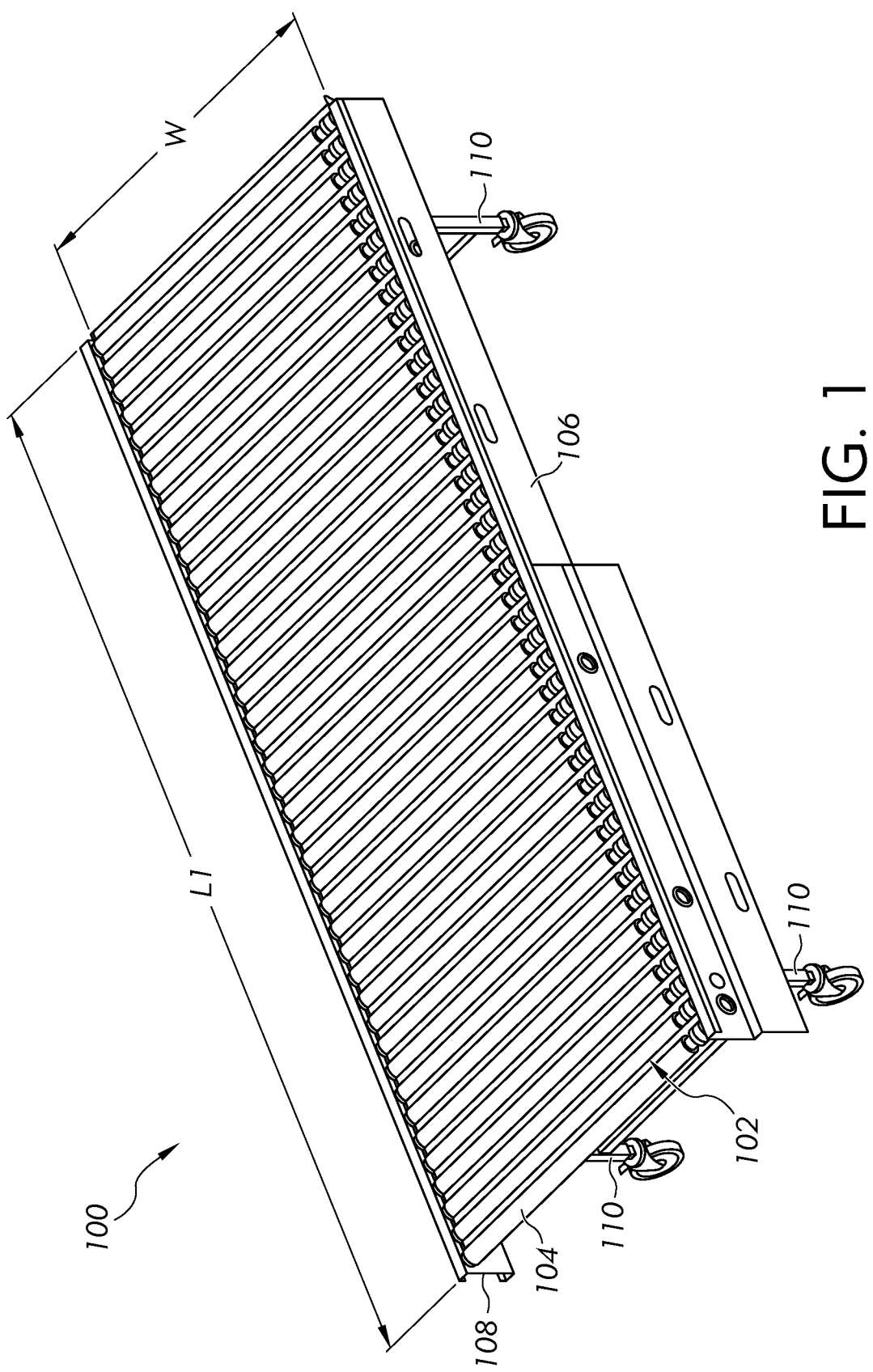
FIG. 1 is a perspective view of a roller conveyor system having an exemplary roller gap filler system installed.

Various technologies pertaining to a roller gap filler system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Terms such as "first" and "second" are used herein for identification purposes. These terms are not intended to imply any sort of order; for instance, a second mounting bracket can be installed prior to, subsequent to, or concurrent with installation of a first mounting bracket.

FIG. 1 illustrates a perspective view of a roller conveyor system 100 having an example roller gap filler system 102 installed. The roller conveyor system 100 has a length L1, a width W, and utilizes a plurality of evenly spaced apart, rotatable cylindrical rollers 104 to move objects along the length L1 of the roller conveyor system 100. The roller gap filler system 102 is configured to mount to the roller conveyor system 100 to block the objects being conveyed from falling between the rollers 104. The roller conveyor system 100 may be configured in a variety of ways. Any type of roller conveyor system 100 that utilizes a plurality of spaced apart, rotatable cylindrical rollers 104 to move objects along the roller conveyor system 100 may use the exemplary roller gap filler system 102. The rollers 104 may be free-rotating rollers, such as in a gravity roller conveyor, or may be driven, such as by a belt, chains, motors, or other drive mechanisms.

Figure 2:
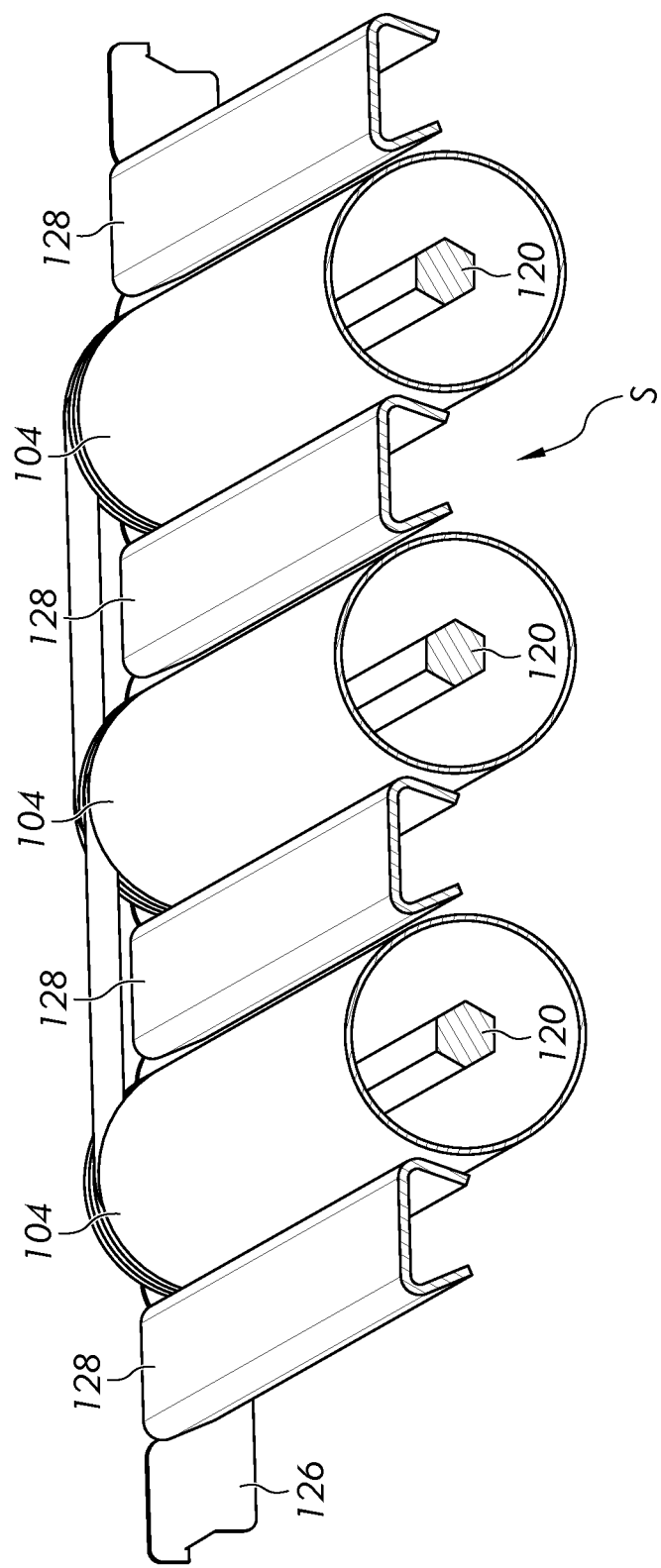
FIG. 2 is a partial, cross-section view of the roller conveyor system of FIG. 1.

In the illustrated implementation, the plurality of evenly spaced apart, rotatable cylindrical rollers 104 are mounted in series between a first frame member 106 and a second frame member 108. The frame members 106, 108 may be mounted on a plurality of legs 110 that support the frame members 106, 108 and rollers 104 at an elevated position off of the ground. Each of the plurality of rollers 104 is rotatably mounted on a corresponding axle 120, as shown in FIG. 2. Each axle 120 spans between the first frame member 106 and the second frame member 108 and is fixed relative to the frame members 106, 108. In the illustrated implementation, each axle 120 has a hexagon shaped cross-section. In other implementations, however, each axle 120 may have any suitable cross-section, such as round, square, or other suitable shape.

The roller gap filler system 102 may be configured in a variety of ways. In the illustrated implementation, as shown in FIG. 3, the roller gap filler system 102 includes a first mounting bracket 124, a second mounting bracket 126, and one or more filler bars 128 extending between, and supported by, the first mounting bracket 124 and the second mounting bracket 126. Each of the one or more filler bars 128 is releasably attached to the first mounting bracket 124 and the second mounting bracket 126. Each filler bar 128 includes a latching mechanism 129 (FIG. 7) for releasably attaching the filler bar 128 to the second mounting bracket 126.

FIG. 4 illustrates an example filler bar 128 of the roller gap filler system 102. The filler bar 128 has an elongated body 130 extending along a longitudinal axis A. The filler bar body 130 includes a first end portion 132 and a second end portion 134 (FIG. 3) opposite the first end portion 132. The filler bar 128 has a length L2 (FIG. 3) that spans the width W, or most of the width W, of the roller conveyor system 100. The filler bar 128 may be configured in a variety of ways. Any configuration that allows the filler bar 128 to be positioned in a gap or space S (FIG. 2) between two adjacent rollers 104 to block objects being conveyed from falling between the rollers 104 may be used.

In the illustrated implementation, the filler bar 128 includes an upper wall 136, a first side wall 138 extending from the upper wall 136, and a second side wall 140 opposite the first side wall 138 and extending from the upper wall 136. The first and second side walls 138, 140 taper inwards (i.e., converge toward each other) as the first and second wall 138, 140 extend away from the upper wall 136 to form a trapezoid-shaped cross-section. The filler bar 128 includes an open lower end 142 such that the filler bar 128 forms a channel 144. Each filler bar 128 can be made from any suitable material or materials. In the illustrated implementation, the filler bar 128 is made from galvanized steel.

Figure 5:
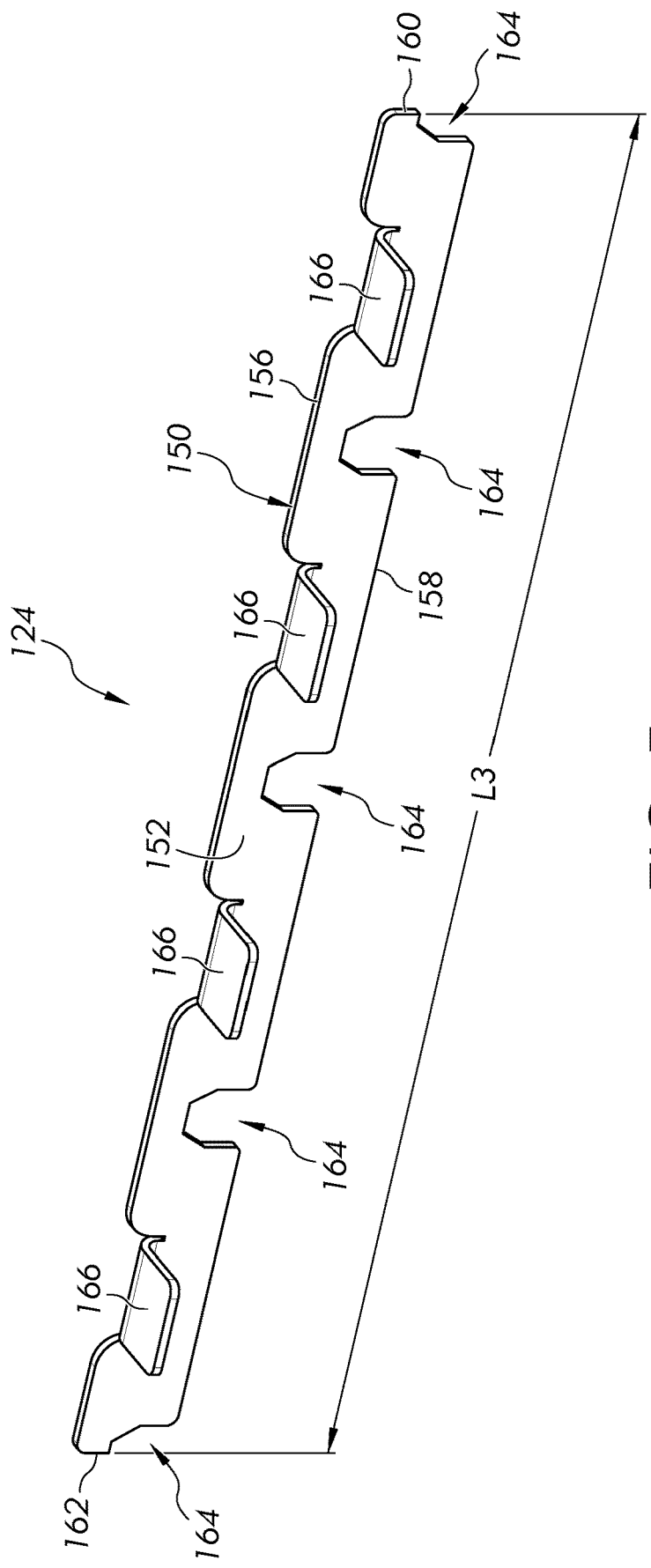
FIG. 5 is a perspective view of a first mounting bracket of the roller gap filler system of FIG. 3.

FIG. 5 illustrates an example first mounting bracket 124 of the roller gap filler system 102. The first mounting bracket 124 may be configured in a variety of ways. Any configuration that can support the first end portion 132 of one or more filler bars 128 may be used. In the illustrated implementation, the first mounting bracket 124 has an elongated body 150 having a planar inner face 152, a planar outer face 154 (FIG. 3) opposite and parallel the inner face 152, a top edge 156 extending between the inner face 152 and the outer face 154, a bottom edge 158 opposite the top edge 156 and extending between the inner face 152 and the outer face 154, a first side edge 160 extending between the top edge 156 and the bottom edge 158, and a second side edge 162 opposite the first side edge 160 and extending between the top edge 156 and the bottom edge 158.

The first mounting bracket 124 is configured to mount to the roller conveyor system 100 with the inner face 152 facing inward (i.e., toward the rollers 104). The first mounting bracket 124 may mount to the roller conveyor system 100 in any suitable manner. In the illustrated implementation, the first mounting bracket 124 is configured to mount to the roller conveyor system 100 without the use of fasteners or need for tools. In particular, the bottom edge 158 includes a series of recesses or cut-outs 164. Each recess 164 is configured to receive an axle 120 such that the first mounting bracket 124 sits on top of, and is supported by, the axles 120. Each recess 164 may have a shape that is complimentary to the cross-section shape of the portion of the axle 120 in contact with the first mounting bracket 124 (e.g., a shape complementary to a hexagon cross-section of the axle).

The first mounting bracket 124 has a length L3. The length L3 may be long enough to span two or more axles 120. In the illustrated implementation, the first mounting bracket 124 includes three full recesses 164 and two half recesses at the first and second side edges 160, 162. Thus, the first mounting bracket 124 contacts and is supported on five axles 120. In other implementations, the first mounting bracket 124 may contact and be supported by more or less than five axles 120.

The first mounting bracket 124 is configured to support the first end portion 132 of one or more filler bars 128. The first mounting bracket 124 may support the first end portion 132 in a variety of ways. In the illustrated implementation, the first mounting bracket 124 includes one or more mounting tabs 166. Each mounting tab 166 extends inward from the inner face 152 at a position adjacent the top edge 156. Each mounting tab 166 extends perpendicular to the inner face 152 and is configured to be received within the channel 144 at the first end portion 132 of the filler bar 128. Thus, the upper wall 136 of the filler bar 128 engages and is supported by the mounting tab 166.

In the illustrated implementation, the first mounting bracket 124 includes four mounting tabs 166 evenly spaced along the length L3 of the first mounting bracket 124. Each mounting tab 166 is generally positioned equidistant between recesses 164 along the length L3 of the first mounting bracket 124. Thus, the first mounting bracket 124 contacts and supports four filler bars 128. In other implementations, the first mounting bracket 124 may contact and support more or less than four filler bars 128.

Figure 6:
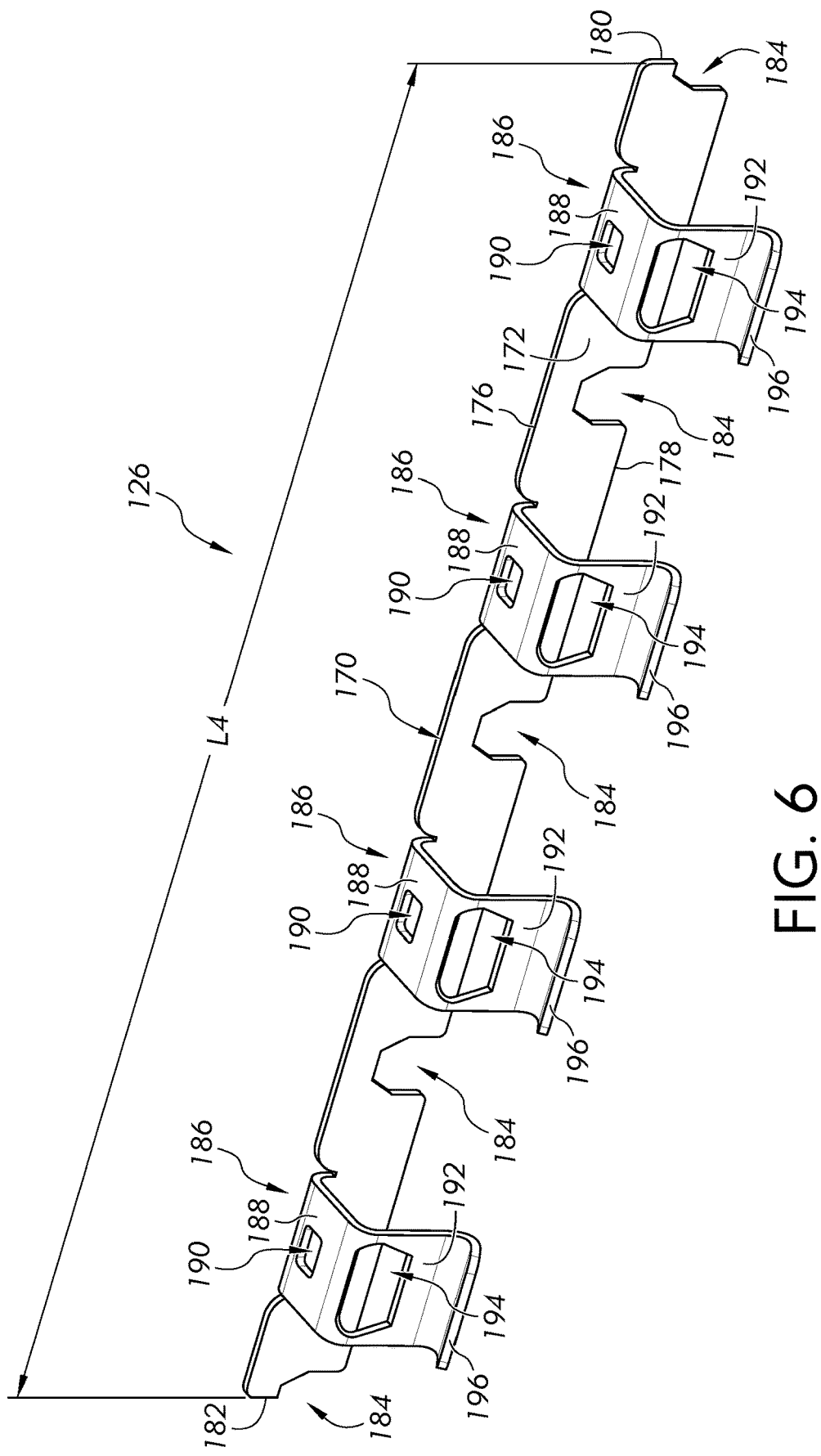
FIG. 6 is a perspective view of a second mounting bracket of the roller gap filler system of FIG. 3.

FIG. 6 illustrates an example second mounting bracket 126 of the roller gap filler system 102. The second mounting bracket 126 may be configured in a variety of ways. Any configuration that can support the second end portion 134 of one or more filler bars 128 may be used. In the illustrated implementation, the second mounting bracket 126 has an elongated body 170 having a planar inner face 172, a planar outer face (not shown) opposite and parallel the inner face 172, a top edge 176 extending between the inner face 172 and the outer face (not shown), a bottom edge 178 opposite the top edge 176 and extending between the inner face 172 and the outer face (not shown), a first side edge 180 extending between the top edge 176 and the bottom edge 178, and a second side edge 182 opposite the first side edge 180 and extending between the top edge 176 and the bottom edge 178.

The second mounting bracket 126 is configured to mount to the roller conveyor system 100 with the inner face 172 facing inward. The second mounting bracket 126 may mount to the roller conveyor system 100 in any suitable manner. In the illustrated implementation, the second mounting bracket 126 is configured to mount to the roller conveyor system 100 without the use of fasteners and in a similar manner to which the first mounting bracket 124 mounts to the roller conveyor system 100. In particular, the bottom edge 178 includes a series of recesses or cut-outs 184. Each recess 184 is configured to receive an axle 120 such that the second mounting bracket 126 sits on top of and is supported by one or more of the axles 120. Each recess 184 may have a shape that is complimentary to the cross-section shape of the portion of the axle 120 in contact with the second mounting bracket 126 (e.g., a shape complementary to a hexagon cross-section of the axle).

The second mounting bracket 126 has a length L4. The length L4 may be long enough to span two or more axles 120. In the illustrated implementation, the second mounting bracket 126 includes three full recesses 184 and two half recesses at the first and second side edges 180, 182. Thus, the second mounting bracket 126 contacts and is supported on five axles 120. In other implementations, the second mounting bracket 126 may contact and be supported by more or less than five axles 120.

The second mounting bracket 126 is configured to support the second end portion 134 of one or more filler bars 128. The second mounting bracket 126 may support the second end portion 134 in a variety of ways. In the illustrated implementation, the second mounting bracket 126 includes one or more mounting tabs 186. Each mounting tab 186 includes a first portion 188 extending inward from the inner face 172 (e.g., perpendicular to the inner face 172) and adjacent the top edge 176. The first portion 188 includes a first aperture 190 extending through the first portion 188. Each mounting tab 186 includes a second portion 192 extending downward from the first portion 188 (e.g., parallel to the inner face 172 toward the bottom edge 178). The second portion 192 includes a second aperture 194 for engaging the latching mechanism 129. The second mounting bracket 126 may also include a third portion 196 extending inward from the second portion 192 below the second aperture 194 (i.e., opposite the first portion).

In the illustrated implementation, the second mounting bracket 126 includes four mounting tabs 186 evenly spaced along the length L4 of the second mounting bracket 126. Each mounting tab 186 is generally positioned equidistant between recesses 184 along the length L4 of the second mounting bracket 126. Thus, the second mounting bracket 126 contacts and supports four filler bars 128. In other implementations, the second mounting bracket 126 may contact and support more or less than four filler bars 128.

Figure 7:
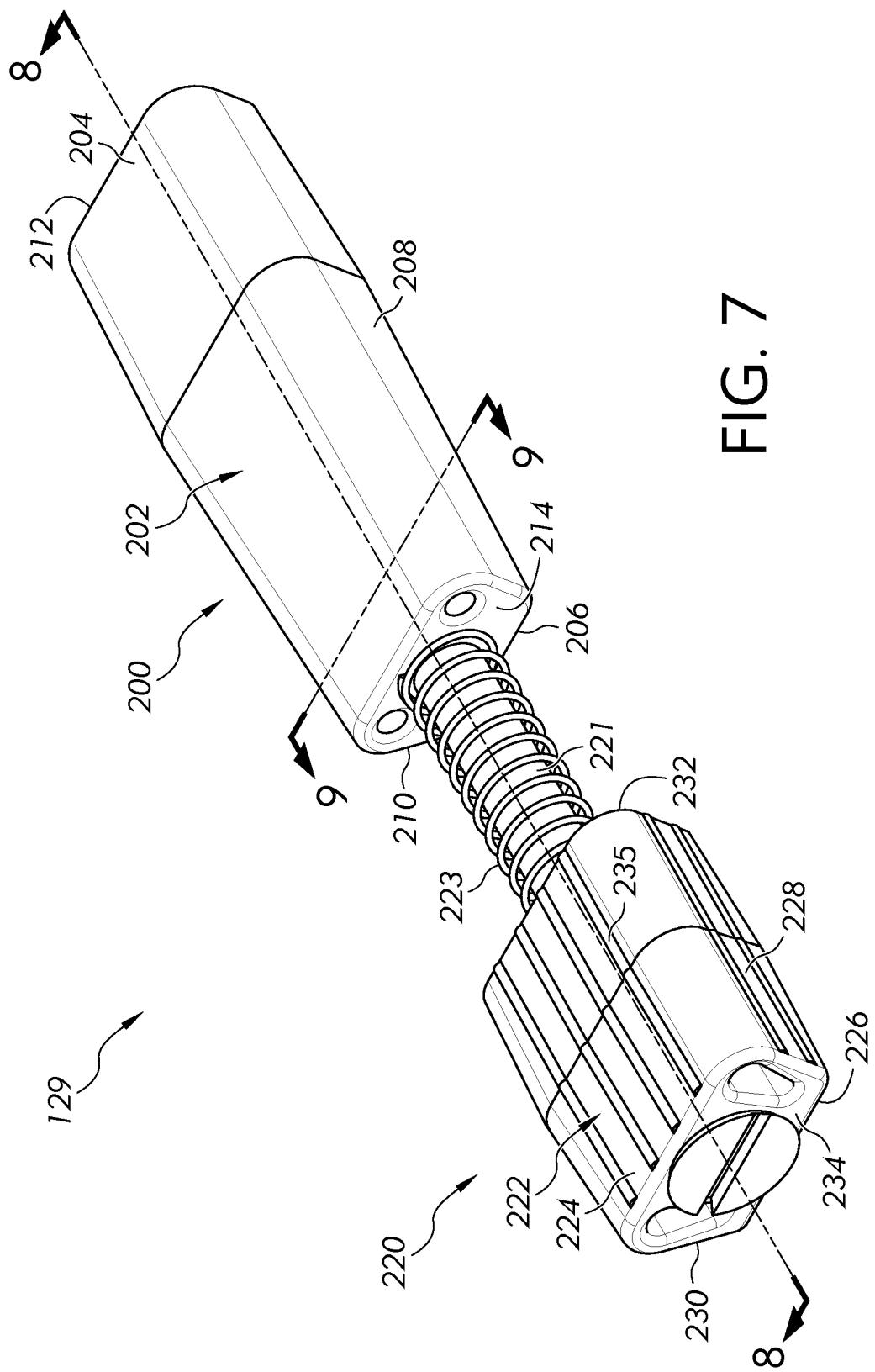
FIG. 7 is a perspective view of an exemplary latching mechanism of the roller gap filler system of FIG. 3.

FIGS. 7-8 illustrate an example latching mechanism 129 of the roller gap filler system 102. The roller gap filler system 102 includes a plurality of latching mechanisms 129. Each filler bar 128 has a corresponding one of the plurality of latching mechanisms 129 associated therewith. Each latching mechanism 129 is configured to attach the second end portion 134 of the filler bar 128 to the second mounting bracket 126. The latching mechanism 129 may be configured in a variety of ways. In the illustrated implementation, the latching mechanism 129 includes a moveable member or plunger 200 configured to be positioned, at least partially, within the channel 144 of the filler bar 128.

The plunger 200 is moveable between a coupling position to couple the filler bar 128 to the second mounting bracket 126 and a release position to uncouple the filler bar 128 from the first mounting bracket. The plunger 200 may be configured in a variety of ways. In the illustrated implementation, the plunger 200 has a plunger body 202 shaped as a trapezoidal prism with rounded corners. The plunger body 202 has an upper surface 204, a lower surface 206 opposite the upper surface 204, a first side surface 208 extending between the upper surface 204 and the lower surface 206, and a second side surface 210 opposite the first side surface 208 and extending between the upper surface 204 and the lower surface 206. The first side surface 208 and the second side surface 210 taper inward (i.e., converge toward each other) from the upper surface 204 to the lower surface 206.

As shown in FIG. 9, the cross-section shape of the plunger 200 is complementary to the cross-section shape of the channel 144. Furthermore, the maximum width MW of the plunger 200 is greater than the width WO of the open lower end 142 of the filler bar 128. Thus, the complementary shape of the plunger 200 allows the plunger 200 to easily move longitudinally along the axis A (i.e., axial movement) while being prevented from falling out of the channel 144 due to the maximum width MW of the plunger 200 being greater than the width WO of the open lower end 142.

The plunger 200 includes a distal end 212 and a proximal end 214 opposite the distal end 212. The distal end 212 is configured to be received through the second aperture 194 of the mounting tab 186 of the second mounting bracket 126. In the illustrated implementation, the distal end 212 is flat and generally perpendicular to the upper and lower surfaces 204, 206. In other implementations, however, the distal end 212 can have any suitable shape, such as tapered, pointed, rounded, or other suitable shapes.

In the illustrated implementation, at least a portion of the plunger body 202 converges or tapers inward from the distal end 212 to the proximal end 214 such that the cross section of the plunger body 202 at the proximal end 214 is smaller in area than the cross section of the plunger body 202 at the distal end 212. The smaller cross section at the proximal end 214 makes movement of the plunger 200 in the channel 144 easier.

The latching mechanism 129 further includes an anchor member 220, a connector 221, and a biasing member 223. The anchor member 220 is configured to anchor the latching mechanism 129 within the channel 144 of the filler bar 128. The anchor member 220 may be configured in a variety of ways. Any configuration that can anchor the latching mechanism 129 within the channel 144 may be used.

In the illustrated implementation, the anchor member 220 has an anchor body 222 shaped as a trapezoidal prism with rounded corners. The anchor body 222 has an upper surface 224, a lower surface 226 opposite the upper surface 224, a first side surface 228 extending between the upper surface 224 and the lower surface 226, and a second side surface 230 opposite the first side surface 228 and extending between the upper surface 224 and the lower surface 226. The first side surface 228 and the second side surface 230 taper inward (i.e., converge toward each other) from the upper surface 224 to the lower surface 226.

The cross-section shape of the anchor member 220 is complementary to the cross-section shape of the channel 144 in a similar way as the plunger 200. Thus, the anchor member 220 is prevented from falling out of the channel 144 due to being wider than the open lower end 142 of the filler bar 128. The plunger 200 includes a distal end 232 and a proximal end 234 opposite the distal end 232. In the illustrated implementation, the distal end 232 and the proximal end 234 are flat and generally perpendicular to the upper and lower surfaces 224, 226. In other implementations, however, the distal end 232 and the proximal end 234 can have any suitable shape, such as tapered, pointed, rounded, or the like.

The anchor member 220 is configured to be fixed within the channel 144 of the filler bar 128. The anchor member 220 may be fixed within the channel 144 in a variety of ways, such as press fit, adhesives, fasteners, or any other suitable manner of fixing the anchor member 220 within the channel. In the illustrated implementation, the anchor member 220 is press fit. Therefore, the size of the anchor member 220 is configured to provide an interference fit with the walls 136, 138, 140 of the filler bar 128. The anchor member 220 may include one or more features to account for the tolerance of the channel cross section. In the illustrated implementation, the anchor member 220 includes one or more longitudinal ridges 235 on one or more of the upper surface 224, the lower surface 226, the first side surface 228 and the second side surface 230. The ridges 235 extend sufficiently from the surfaces to account for the tolerance in the channel 144 size and ensure a secure press fit of the anchor member 220.

The anchor member 220 includes a passage 236 extending through the anchor member 220 from the distal end 232 to the proximal end 234. The connector 221 extends through the passage 236 and connects the anchor member 220 to the plunger 200. The connector 221 may be configured in a variety of ways. In the illustrated implementation, the connector 221 is a screw or bolt having an elongated shaft 240 with an externally threaded distal end 242 and an enlarged head 244 defining a proximal end 246.

The proximal end 234 of the plunger 200 includes an internally threaded passage 248 configured to threadably engage the externally threaded distal end 242 of the connector 221. The enlarged head 244 is configured to be too large to fit through the passage 236 in the anchor member 220. Thus, the proximal end 234 of the anchor member 220 acts as a stop preventing the connector 221 from pulling through the passage 236.

With the connector 221 threaded into the internally threaded passage 248, the connector 221 and the plunger 200 are fixed to move together relative to the anchor member 220. The coupled position corresponds to when the enlarged head 244 abuts the proximal end 234 of the anchor member 220 and the plunger 200 is extended. As shown by arrow B in FIG. 8, the plunger 200 is moveable axially closer to the anchor member 220 to an uncoupled position. The biasing member 223 is positioned to bias the plunger 200 to the extended coupled position.

The biasing member 223 may be configured in a variety of ways. Any biasing member(s) 223 capable of biasing the plunger 200 to the coupled position may be used. In the illustrated implementation, the biasing member 223 is a spring positioned around the shaft 240 of the connector 221 between the plunger 200 and the anchor member 220. The biasing member 223 is compressed between the proximal end 214 of the plunger 200 and the distal end 232 of the anchor member 220.

Figure 10:
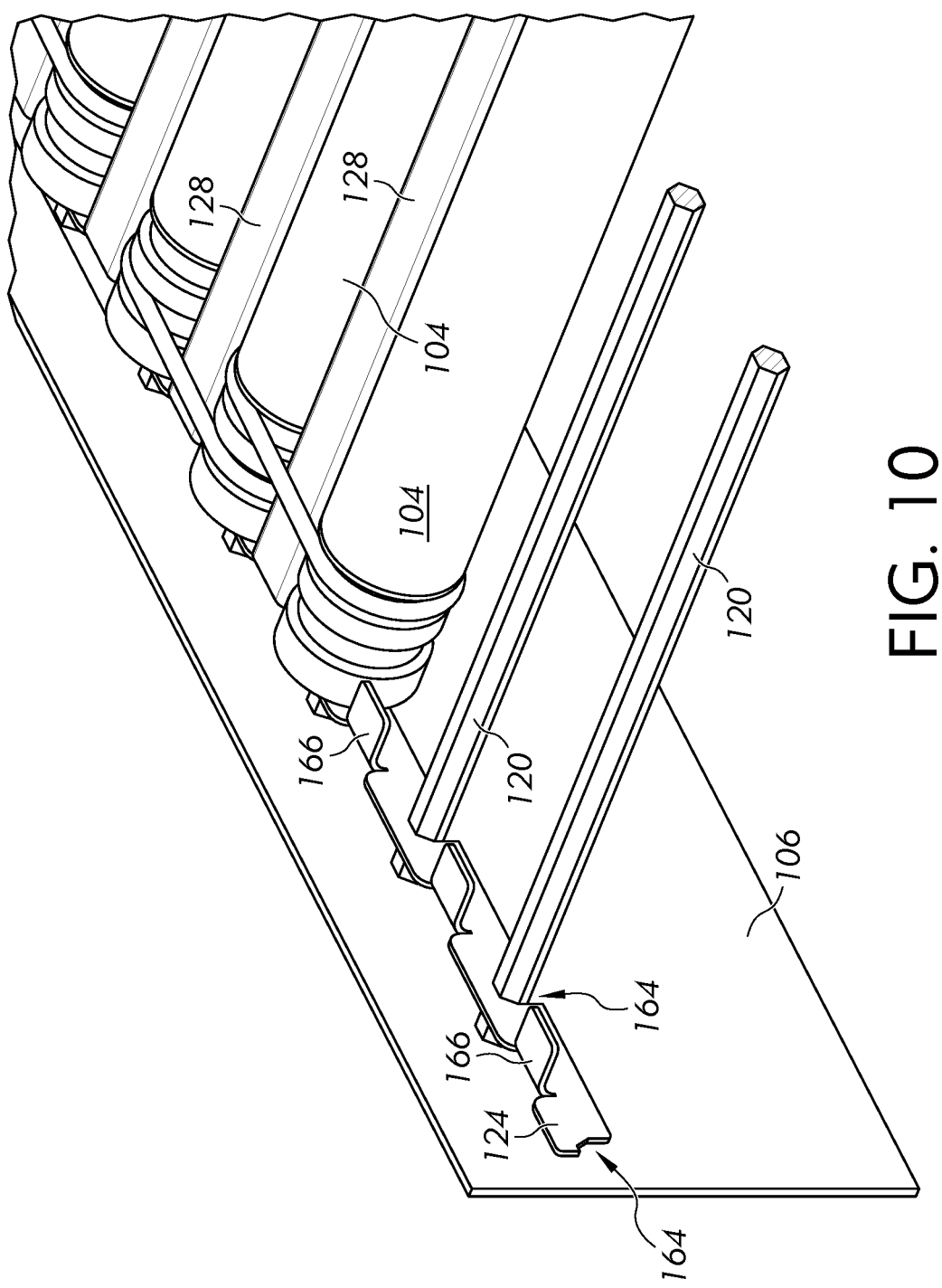
FIG. 10 is a partial perspective view of the roller conveyor system showing the exemplary roller gap filler system installed.

The roller gap filler system 102 is configured to be retrofitted onto the roller conveyor system 100 or incorporated with the roller conveyor system 100 when first assembled. To add the roller gap filler system 102 to the roller conveyor system 100, the first mounting bracket 124 is positioned adjacent the first frame member 106 with the outer face 154 facing the first frame member 106 and the inner face 152 facing inward (i.e., toward the rollers 104). The first mounting bracket 124 is installed by placing the first mounting bracket 124 onto the axles 120 such that the axles 120 are received within the recesses 164 of the first mounting bracket 124 as shown in FIG. 10. In this position, the first mounting bracket 124 is supported by the axles 120 and each of the mounting tabs 166 are positioned along the length L1 of the roller conveyor system 100 in between successive rollers 104.

The second mounting bracket 126 is installed opposite, but in a similar manner to, the first mounting bracket 124. In particular, the second mounting bracket 126 is positioned adjacent the second frame member 108 with the outer face (not shown) facing the second frame member 108 and the inner face 172 facing inward (i.e., toward the rollers 104). The second mounting bracket 126 is installed by placing the second mounting bracket 126 onto the axles 120 such that the axles 120 are received within the recesses 184 of the second mounting bracket 126. In this position, the second mounting bracket 126 is supported by the axles 120 and each of the mounting tabs 186 are positioned along the length L1 of the roller conveyor system 100 in between successive rollers 104. Thus, each of the mounting tabs 186 of the second mounting bracket 126 are positioned to align with a corresponding one of the mounting tabs 166 of the first mounting bracket across the width W of the roller conveyor system 100.

With both the first and second mounting brackets 124, 126 in place, the filler bars 128 may be installed. Each of the filler bars 128 can be installed on the first mounting bracket 124 by positioning the filler bar 128 such that the open lower end 142 is facing downward. The first end portion 132 of the filler bar 128 can be slide onto such the mounting tab 166 such that the mounting tab 166 is received in the channel 144. In this position, the mounting tab 166 supports the first end portion 132.

Figure 11:
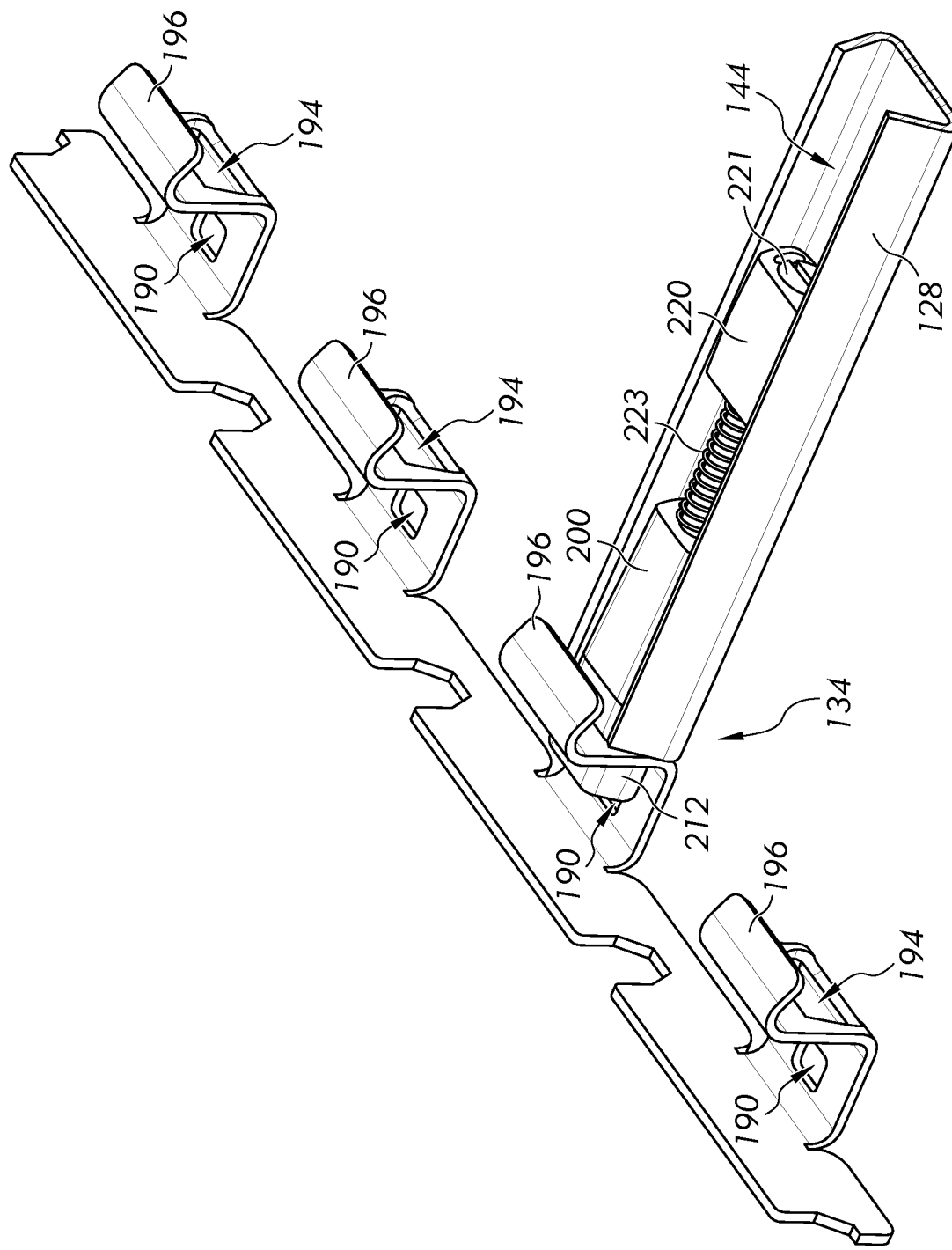
FIG. 11 is a perspective view of the latching mechanism of FIG. 7 coupling the filler bar to the second mounting bracket.

The latching mechanism 129 is configured to be received in the channel 144 of one of the filler bars 128 at the second end portion 134. FIG. 11 illustrates the latching mechanism 129 installed in the channel 144 of one of the filler bars 128. FIG. 11 illustrates the filler bar 128 turned upside down for ease of illustration. The anchor member 220 may be press fit into the channel 144 such that the proximal end 234 is facing inward (i.e., away from the second end portion 134 of the filler bar 128).

The plunger 200 is also received within the channel 144 at a position outward of the anchor member (i.e., closer to the second end portion 134). The plunger 200 can be attached to the anchor member 220 after, or prior to, the anchor member 220 has been press fit into the channel 144. As described above, the plunger 200 is fixably attached to the connector 221 which is received through the passage 236 in the anchor member 220 and is biased by the biasing member 223 away from the anchor member 220. To connect the second end portion 134 of the filler bar 128 to the second mounting bracket 126, the plunger 200 is pushed toward the anchor member 220 such that the distal end 212 of the plunger 200 does not interfere with placing the second end portion 134 of the filler bar 128 adjacent the second portion 192 of the mounting tab 186 of the second mounting bracket 126. For example, the distal end 212 of the plunger 200 may be pressed into the channel 144, or nearly into the channel, to avoid contacting the mounting tab 186. The plunger 200 is in the uncoupled position when retracted to avoid interfering with the mounting tab 186.

Once the second end portion 134 of the filler bar 128 is adjacent the second portion 192 of the mounting tab 186, the plunger 200 is aligned with the aperture 194 and released. The biasing member 223 biases the plunger 200 away from the anchor member 220 such that the distal end 212 of the plunger 200 is received through the aperture 194 in the second mounting bracket 126 to couple the second end portion 134 of the filler bar 128 to the second mounting bracket 126. The location of the anchor member 220 within the channel 144 is set to allow the plunger 200 to extend through the aperture 194 in the second mounting bracket 126.

As indicated above, both the first and second mounting brackets 124, 126 include four mounting tabs 166, 186. Thus, three additional filler bars 128 can be mounted on the roller conveyor system 100 in the same way described above. Furthermore, additional first and second mounting brackets 124, 126 can be placed, in series, next to each other on the roller conveyor system 100 such that a filler bar 128 can be mounted between all of the plurality of rollers 104 in the roller conveyor system 100. As shown in FIG. 2, each filler bar 128 is positioned between two successive rollers of the plurality of rollers 104 to fill the gap or space S between the rollers 104 along the length L1 of the roller conveyor system 100. As a result, small objects being conveyed are prevented from falling between the rollers 104.

To remove the roller gap filler system 102 from the roller conveyor system 100, or to replace one or more components, one of the filler bars 128 is decoupled from the second mounting bracket 126. In particular, the plunger 200 is moved from the coupled position to the uncoupled positioned (i.e., retracted against the bias of the biasing member 223). The second mounting bracket 126 is configured to provide access to the plunger 200 from both above and below the plunger 200 when the plunger 200 is in the coupled position. In particular, the distal end 212 of the plunger 200 can be accessed from above via the first aperture 190 in the first portion 188 of the second mounting bracket 126. Further, as shown in FIG. 11, the distal end 212 of the plunger 200 is exposed from the bottom and can be easily accessed.

As shown in FIG. 11, the third portion 196 of the second mounting bracket 126 extends under the second end portion 134 of the filler bar 128 when the second end portion 134 is coupled to the second mounting bracket 126. Thus, when the second end portion 134 is released from the second mounting bracket 126, the third portion 196 of the second mounting bracket 126 acts as a ledge to prevent the second end portion 134 from inadvertently falling down between the rollers 104 during assembly or disassembly. With the second end portion 134 decoupled from the second mounting bracket 126, the filler bar 128 can be pulled away from the first mounting bracket 124 to pull the channel 144 off of the mounting tab 166 and disconnect the filler bar 128 from the roller conveyor system 100. Once all of the filler bars 128 are disconnected, the first and second mounting brackets 124, 126 can be lifted off of axles 120 and removed from the roller conveyor system 100. Thus, the roller gap filler system 102 can be installed and uninstalled from the roller conveyor system 100 without tools or external fasteners.

System and method have been described herein in accordance with at least the examples set forth below.

(A1) In one aspect, a roller gap filler system for a roller conveyor system having a plurality of spaced apart rotating cylindrical rollers includes a first mounting bracket, a second mounting bracket, a first filler bar, and a plunger associated with the first filler bar. The first mounting bracket is configured to mount adjacent a first end of the plurality of rollers. The second mounting bracket is configured to mount adjacent a second end of the plurality of rollers, where the second end is opposite the first end. The first filler bar is configured to extend between the first mounting bracket and the second mounting bracket and be positioned between a first roller and a second roller of the plurality of rollers. The plunger is moveable between a coupling position to couple the first filler bar to the second mounting bracket and a release position to uncouple the first filler bar from the second mounting bracket. The plunger is biased to the coupling position.

(A2) In some embodiments of the system of (A1), the plunger is moveable along a longitudinal axis of the first filler bar between the release position and the coupling position.

(A3) In some embodiments of the system of (A2), a biasing member is configured to bias the plunger to the coupling position.

(A4) In some embodiments of the system of (A3), the biasing member is a spring.

(A5) In some embodiments of the system of (A2)-(A4), the filler bar defines a longitudinal channel, and the plunger is mounted within the longitudinal channel.

(A6) In some embodiments of the system of (A5), an anchor member is fixed within the channel and coupled to the plunger by the biasing member.

(A7) In some embodiments of the system of (A6), the anchor member is press-fit into the channel.

(A8) In some embodiments of the system of (A5) or (A6), the longitudinal channel is shaped to prevent movement of the plunger in a direction other than along a longitudinal axis of the channel.

(A9) In some embodiments of the system of (A1)-(A8), the second mounting bracket is configured to provide access to a forward end the plunger from both a top side of the plunger and a bottom side of the plunger when the plunger is in the coupling position and attached to the second mounting bracket such that the plunger can be moved to the release position.

(A10) In some embodiments of the system of (A1)-(A9), the system further includes a second filler bar configured to extend between the first mounting bracket and the second mounting bracket and be positioned between the second roller and a third roller of the plurality of rollers and a third filler bar configured to extend between the first mounting bracket and the second mounting bracket and be positioned between the third roller and a fourth roller of the plurality of rollers.

(A11) In some embodiments of the system of (A1)-(A10), the first mounting bracket and the second mounting bracket are configured to mount to the roller conveyor system without fasteners.

(A12) In some embodiments of the system of (A1)-(A11), the second mounting bracket further comprises a ledge extending under an end of the filler bar when the end is in a position to couple to the second mounting bracket.

(B1) In one aspect, a method of filling a gap between rollers of a roller conveyor system includes supporting a first mounting bracket on the axles at a first end of the rollers, supporting a second mounting bracket on the axles at a second end of the rollers, positioning a filler bar in the gap between the rollers, supporting a first end of the filler bar with the first mounting bracket, and coupling a second end of the filler bar to the second mounting bracket with a latching mechanism having a moveable member. The moveable member is configured to move between a coupling position to couple the second end to the second mounting bracket, and a release position to uncouple the second end from the second mounting bracket. The moveable member is biased to the coupling position.

(B2) In some implementations of the method of (B1), supporting a first mounting bracket on the axles further comprises receiving the axles in recesses on the first mounting bracket.

(B3) In some implementations of the method of (B1) or (B2), the moveable member is biased by a spring.

(B4) In some implementations of the method of (B1)-(B3), coupling the second end of the filler bar to the second mounting bracket further comprises receiving the moveable member through an aperture in the second mounting bracket.

(B5) In some implementations of the method of (B1)-(B4), the method further includes anchoring an anchor member of the latching mechanism to the filler bar.

(B6) In some implementations of the method of (B5), anchoring the anchor member further comprises press-fitting the anchor member within a channel of the filler bar.

(B7) In some implementations of the method of (B6), supporting the first end of the filler bar with the first mounting bracket further comprises receiving a portion of the first mounting bracket in the channel of the filler bar.

(B7) In some implementations of the method of (B1)-(B7), the method further includes supporting a second end of the filler bar on a portion of the second mounting bracket when the second end is not coupled to the second mounting bracket.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A roller gap filler system for a roller conveyor system having a plurality of spaced apart rotating cylindrical rollers, the system comprising:
    a first mounting bracket configured to mount adjacent a first end of the plurality of rollers;
    a second mounting bracket configured to mount adjacent a second end of the plurality of rollers, the second end opposite the first end;
    a first filler bar configured to extend between the first mounting bracket and the second mounting bracket and be positioned between a first roller and a second roller of the plurality of rollers; and
    a plunger associated with the first filler bar, the plunger is moveable between a coupling position to couple the first filler bar to the second mounting bracket and a release position to uncouple the first filler bar from the second mounting bracket;
    wherein the plunger is biased to the coupling position.

2. The roller gap filler system according to claim 1, wherein the plunger is moveable along a longitudinal axis of the first filler bar between the release position and the coupling position.

3. The roller gap filler system according to claim 2, further comprising a biasing member configured to bias the plunger to the coupling position.

4. The roller gap filler system according to claim 3, wherein the biasing member is a spring.

5. The roller gap filler system according to claim 2, wherein the first filler bar defines a longitudinal channel, and the plunger is mounted within the longitudinal channel.

6. The roller gap filler system according to claim 5, further comprising an anchor member fixed within the channel and coupled to the plunger by the biasing member.

7. The roller gap filler system according to claim 6, wherein the anchor member is press-fit into the channel.

8. The roller gap filler system according to claim 5, wherein the longitudinal channel is shaped to prevent movement of the plunger in a direction other than along a longitudinal axis of the channel.

9. The roller gap filler system according to claim 1, wherein the second mounting bracket is configured to provide access to a forward end the plunger from both a top side of the plunger and a bottom side of the plunger when the plunger is in the coupling position and attached to the second mounting bracket such that the plunger can be moved to the release position.

10. The roller gap filler system according to claim 1, wherein the system further includes a second filler bar configured to extend between the first mounting bracket and the second mounting bracket and be positioned between the second roller and a third roller of the plurality of rollers and a third filler bar configured to extend between the first mounting bracket and the second mounting bracket and be positioned between the third roller and a fourth roller of the plurality of rollers.

11. The roller gap filler system according to claim 1, wherein the first mounting bracket and the second mounting bracket are configured to mount to the roller conveyor system without fasteners.

12. The roller gap filler system according to claim 1, wherein the second mounting bracket further comprises a ledge extending under an end of the first filler bar when the end is in a position to couple to the second mounting bracket.

13. A method of filling a gap between rollers of a roller conveyor system, the rollers rotatably mounted on axles, the method comprising:
    supporting a first mounting bracket on the axles at a first end of the rollers;
    supporting a second mounting bracket on the axles at a second end of the rollers;
    positioning a filler bar in the gap between the rollers;

supporting a first end of the filler bar with the first mounting bracket; and coupling a second end of the filler bar to the second mounting bracket with a latching mechanism having a moveable member configured to move between a coupling position to couple the second end to the second mounting bracket, and a release position to uncouple the second end from the second mounting bracket;

wherein the moveable member is biased to the coupling position.

14. The method according to claim 13, wherein supporting the first mounting bracket on the axles further comprises receiving the axles in recesses on the first mounting bracket.

15. The method according to claim 13, wherein the moveable member is biased by a spring.

16. The method according to claim 13, wherein coupling the second end of the filler bar to the second mounting bracket further comprises receiving the moveable member through an aperture in the second mounting bracket.

17. The method according to claim 13, further comprising anchoring an anchor member of the latching mechanism to the filler bar.

18. The method according to claim 17, wherein anchoring the anchor member further comprises press-fitting the anchor member within a channel of the filler bar.

19. The method according to claim 18, wherein supporting the first end of the filler bar with the first mounting bracket further comprises receiving a portion of the first mounting bracket in the channel of the filler bar.

20. The method according to claim 13, further comprising supporting the second end of the filler bar on a portion of the second mounting bracket when the second end is not coupled to the second mounting bracket.

\* \* \* \* \*